US008321305B2

(12) United States Patent
Komejan et al.

(10) Patent No.: US 8,321,305 B2
(45) Date of Patent: Nov. 27, 2012

(54) MANAGING ASSEMBLIES WITH UNCERTAIN DEMANDS CONTAINING COMMON PARTS

(75) Inventors: Kent K. Komejan, Rochester, MN (US); Randy M. Reimer, Rochester, MN (US); Kimball A. Stanton, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 12/210,482

(22) Filed: Sep. 15, 2008

(65) Prior Publication Data
US 2010/0070390 A1 Mar. 18, 2010

(51) Int. Cl.
*G06Q 10/00* (2006.01)
*A01K 5/02* (2006.01)
(52) U.S. Cl. .......................................... 705/28; 705/29
(58) Field of Classification Search .................. None
See application file for complete search history.

(56) References Cited

U.S. PATENT DOCUMENTS

| | | | |
|---|---|---|---|
| 5,796,614 A * | 8/1998 | Yamada | 700/106 |
| 6,226,561 B1 * | 5/2001 | Tamaki et al. | 700/100 |
| 7,398,130 B2 * | 7/2008 | Taguchi | 700/107 |
| 7,606,724 B2 * | 10/2009 | Chao et al. | 705/7.25 |
| 2001/0014836 A1 * | 8/2001 | Tamaki et al. | 700/99 |
| 2003/0101107 A1 * | 5/2003 | Agarwal et al. | 705/28 |
| 2005/0043981 A1 * | 2/2005 | Chao et al. | 705/8 |
| 2005/0131779 A1 * | 6/2005 | Kitamura et al. | 705/29 |
| 2006/0212151 A1 * | 9/2006 | Taguchi | 700/99 |

OTHER PUBLICATIONS http://en.wikipedia.org/wiki/Material_Requirements_Planning, "Material Requirements Planning", pp. 1-5, printed Aug. 26, 2008.

\* cited by examiner

*Primary Examiner* — Mussa A Shaawat
(74) *Attorney, Agent, or Firm* — Patterson & Sheridan LLP

(57) ABSTRACT

A system and method for planning common-use parts in such a way that operating inventory levels are reduced without introducing more risk of parts outages. One embodiment comprises determining use of at least one common component in a plurality of product models, receiving a forecast for the plurality of product models that use the common component, computing a demand correction factor for each of the forecasts, and determining inventory requirements for the at least one common component based at least in part on the respective forecasts and demand correction factors.

19 Claims, 11 Drawing Sheets

MANAGING ASSEMBLIES WITH UNCERTAIN DEMANDS CONTAINING COMMON PARTS

TECHNICAL FIELD

The present invention generally relates to computer assisted manufacturing processes, and more specifically, to a computer assisted inventory control system that manages inventory of components based on at least in part based on a degree of commonality between products.

BACKGROUND

Manufacturing traditionally has been organized around a build-to-plan (BTP) or build-to-forecast (BTF) process. A common implementation of a BTP process is the "machine-type model" system. In these systems, there is a set of end products, commonly referred to as MTMs. Demand forecasts over a future planning horizon are generated for each MTM, and updated periodically for each planning cycle, typically, a weekly cycle. A "materials requirements planning" (MRP) type explosion technique is then used to determine the requirements for the components over the planning horizon, based on the bill-of-materials (BOM) structure of each end product. Because of the random variation involved in demand forecasts, safety stock is usually kept for each end product, as well as at each component level, in order to meet a desirable customer service level. However, holding finished goods inventory for any length of time is very costly, particularly in the computer manufacturing business, where product life cycle is measured in months and price reduction takes place almost every other week.

Inventory control software has been developed to compliment the MTM manufacturing processes, which typically rely heavily on sales forecasts. One problem with these systems, however, is that these forecasts are inherently uncertain. Because the risk of under-estimating demand is lower than over-estimating demand, the most prudent manufacturers compensate by planning all elements to the 'high side' to protect potential revenue. However, these overstated forecasts usually result in excess inventory levels and unnecessary scrap costs.

Without a way to more effectively manage assemblies and account for components in inventory, the manufacturing industry will continue to suffer from less efficient ways of handling existing inventory in fulfilling new orders.

SUMMARY

The present invention includes a system and method for planning common-use parts in such a way that operating inventory levels are reduced without introducing more risk of parts outages. By identifying the common elements within the product Bill or Material (BOM) structure, one can save costs by forecasting the common elements at the expected level and continue to plan the unique features at the high side of projections.

One aspect of the present invention is an apparatus comprising at least one processor, a memory coupled to the at least one processor, and an inventory planning mechanism residing in the memory and executed by the at least one processor. The inventory mechanism is adapted to determine use of at least one common component in a plurality of product models, receiving a forecast and an error factor for the plurality of product models, and determine inventory requirements for the at least one common component based at least in part on the respective forecast and error factor for each of the plurality of models. In some embodiments, the inventory planning mechanism is further adapted to determine current inventory of the common component, analyze a product bill of materials to identify common parts, and receive a sales forecast and an expected forecast for each of the product models. The error factor may be based at least in part on the delta between the two forecasts.

Another aspect of the present invention is a computer-implemented method for determining purchase requirements for a component in an inventory control system. One embodiment of the method comprises determining use of at least one common component in a plurality of product models, receiving a forecast for the plurality of product models that use the common component, computing a demand correction factor for each of the forecasts, and determining inventory requirements for the at least one common component based at least in part on the respective forecasts and demand correction factors. In some embodiments, determining inventory requirements comprises reading a description for the at least one assembly that specifies at least one component of the at least one assembly. Some embodiments may further comprise determining a current inventory of the common component, analyzing a product bill of materials to identify common parts, receiving a sales forecast and an expected forecast for each of the product models, and generating a part number delta demand from the sales forecast and the expected forecast. In these embodiments, the demand correction factor may be based at least in part on the delta demand.

Another aspect of the present invention is a computer program product, comprising a computer-readable storage medium that stores instructions for a method of determining purchase requirements for a component in an inventory control system. One embodiment of the method comprises determining use of at least one common component in a plurality of product models, receiving a forecast for the plurality of product models that use the common component, computing a demand correction factor for each of the forecasts, and determining inventory requirements for the at least one common component based at least in part on the respective forecasts and demand correction factors. In some embodiments, determining inventory requirements comprises reading a description for the at least one assembly that specifies at least one component of the at least one assembly. The method may further comprise determining a current inventory of the common component, analyzing a product bill of materials to identify common parts, receiving a sales forecast and an expected forecast for each of the product models, and generating a part number delta demand from the sales forecast and the expected forecast.

DETAILED DESCRIPTION

Figure 1:
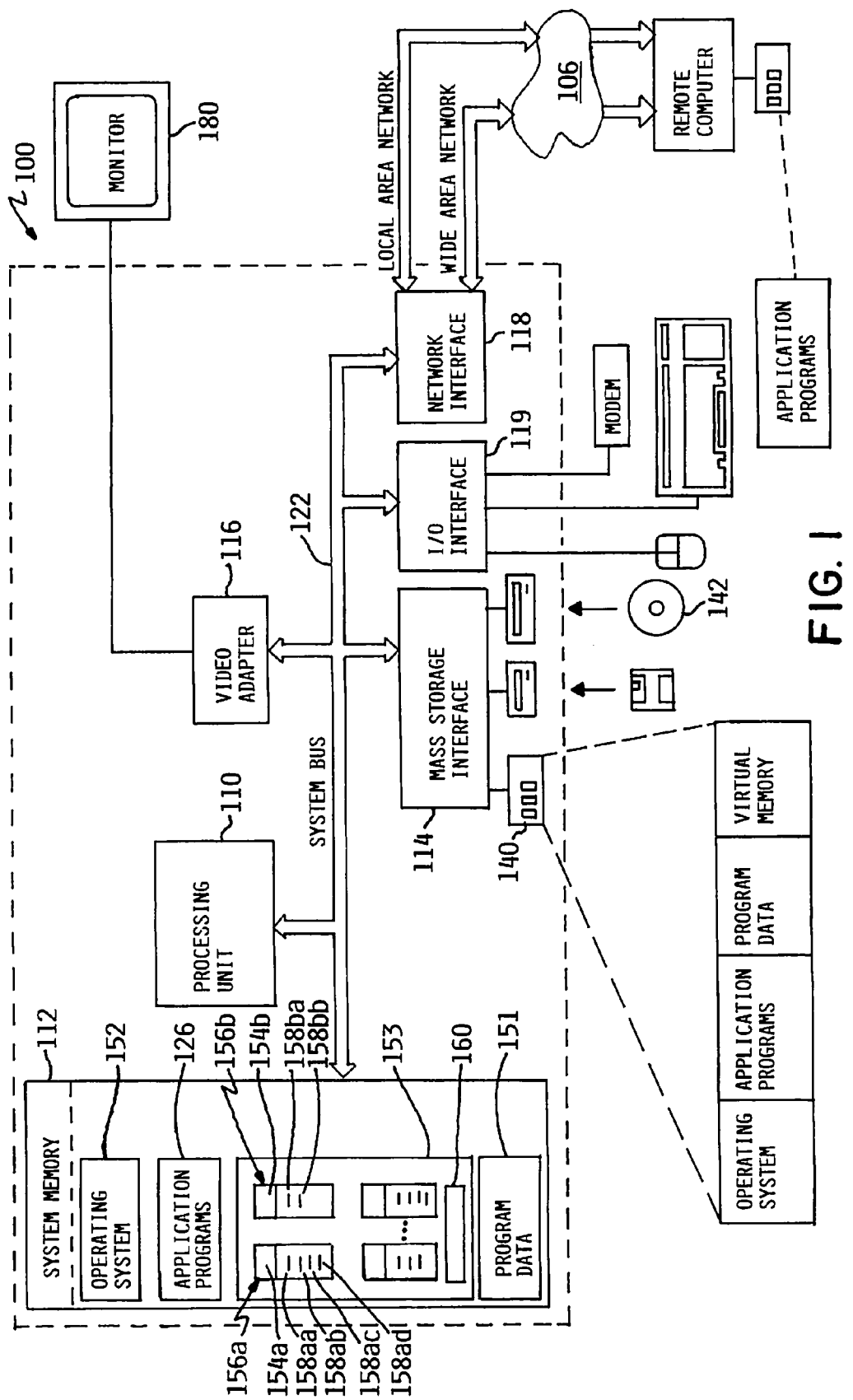
FIG. 1 illustrates one embodiment of a common parts planning system.

FIG. 1 illustrates one embodiment of a common parts planning system 100 that takes common assemblies into account when determining purchase requirements. As shown in FIG. 1, one embodiment of this system 100 comprises one or more central processing units 110, a main memory 112, a mass storage interface 114 that connects one or more mass storage devices (such as a direct access storage device 140 or CD-ROM drive 142) to the common parts planning system 100, a video adapter 116, a network interface 118, and an I/O interface 119. These system components are interconnected through the use of a system bus 122.

The main memory 112 in this embodiment contains program data 151, an operating system 152, an inventory management program 153, and one or more other application programs 126. The data 151 represents any information or commands that serve as input to or output from any program 126, 153 in the planning system 100. The operating system 152 in this embodiment is a multitasking operating system known in the industry as i5/OS; however, those skilled in the art will appreciate that the spirit and scope of this disclosure is not limited to any one operating system. The inventory management program 153 includes a Bill of Materials (BOM) list 154a-154n for each of the sales models 156a-156n produced by the manufacturing organization using the system 100. Each BOM 154, in turn, is composed of a number of part numbers (P/N) 158aa-158nn for each part used to produce the model 156a-156n (for clarity, only some BOMs 154, sales models 156, and P/N 158 labeled in FIG. 1). At least some of the P/N 158 will be common to (i.e., used in the manufacture of) several different sales models 156. The inventory management system 100 also comprises a list of common parts by product 160.

In operation, the common parts planning system 100 manages inventory for manufacturers that use parts with common application across products 156, such that the system 100 will bring the manufacturer's forecast into closer agreement with its actual use, without introducing additional risk. This embodiment uses two sales model planning forecasts as inputs: i) a high-side, or 'Sales Forecast' level; and ii) a most-likely, or 'Expected Forecast' level. The common parts planning system 100 quantifies the number of occurrences a part number (P/N) 158 has in all planning Bill of Materials (BOMs) 154 and assigns a weight factor based on the results. This weight factor is used to shift planning numbers from the Sales Forecast toward the Expected Forecast level, which reduces future excess inventory and scrap costs. The weight factor, in turn, is calculated using statistical estimates of risk, as opposed to conventional 'worst-case' tolerancing.

Figure 2A:
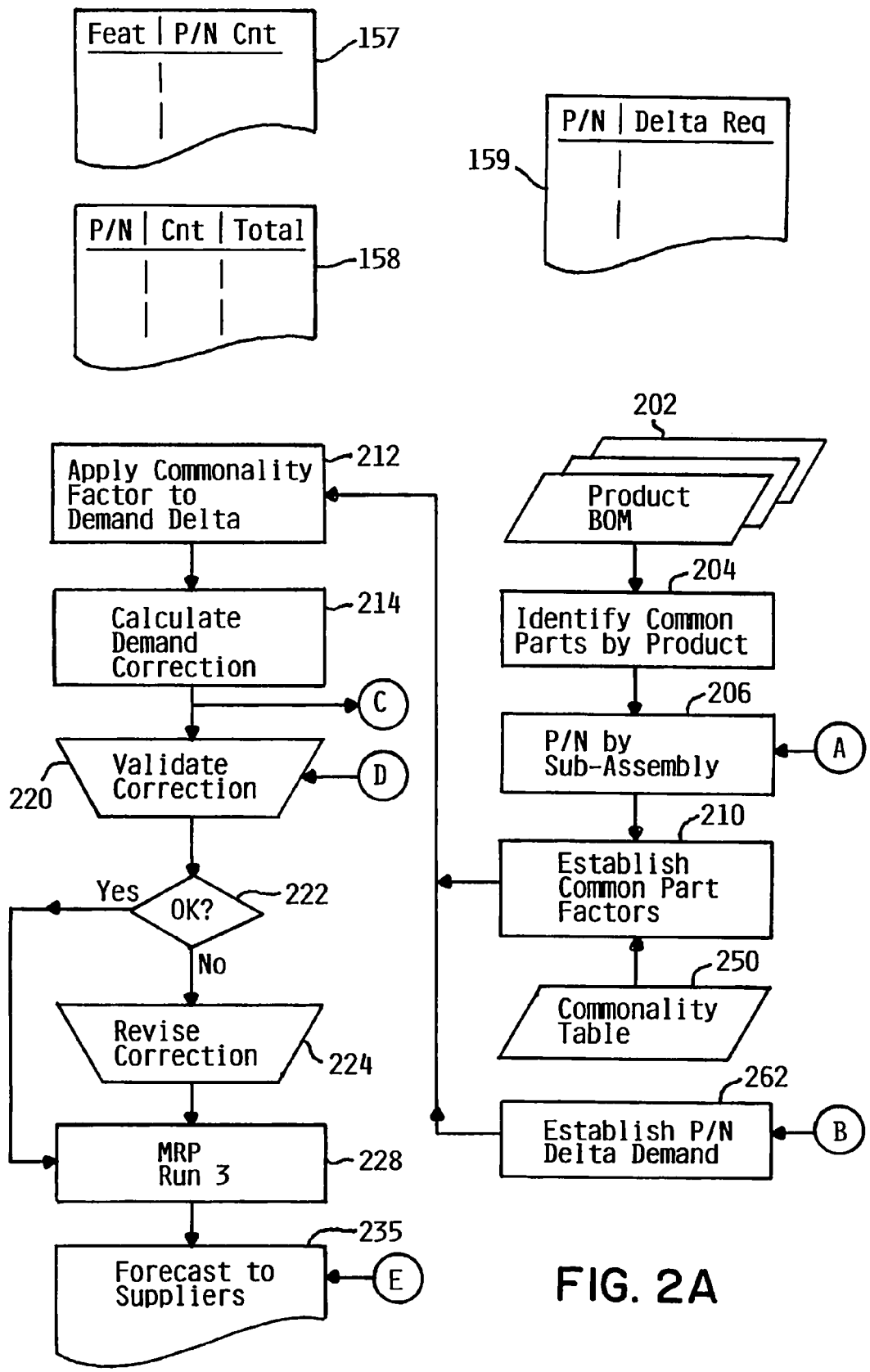
FIG. 2 illustrates the planning system in operation of the system.
Figure 2B:
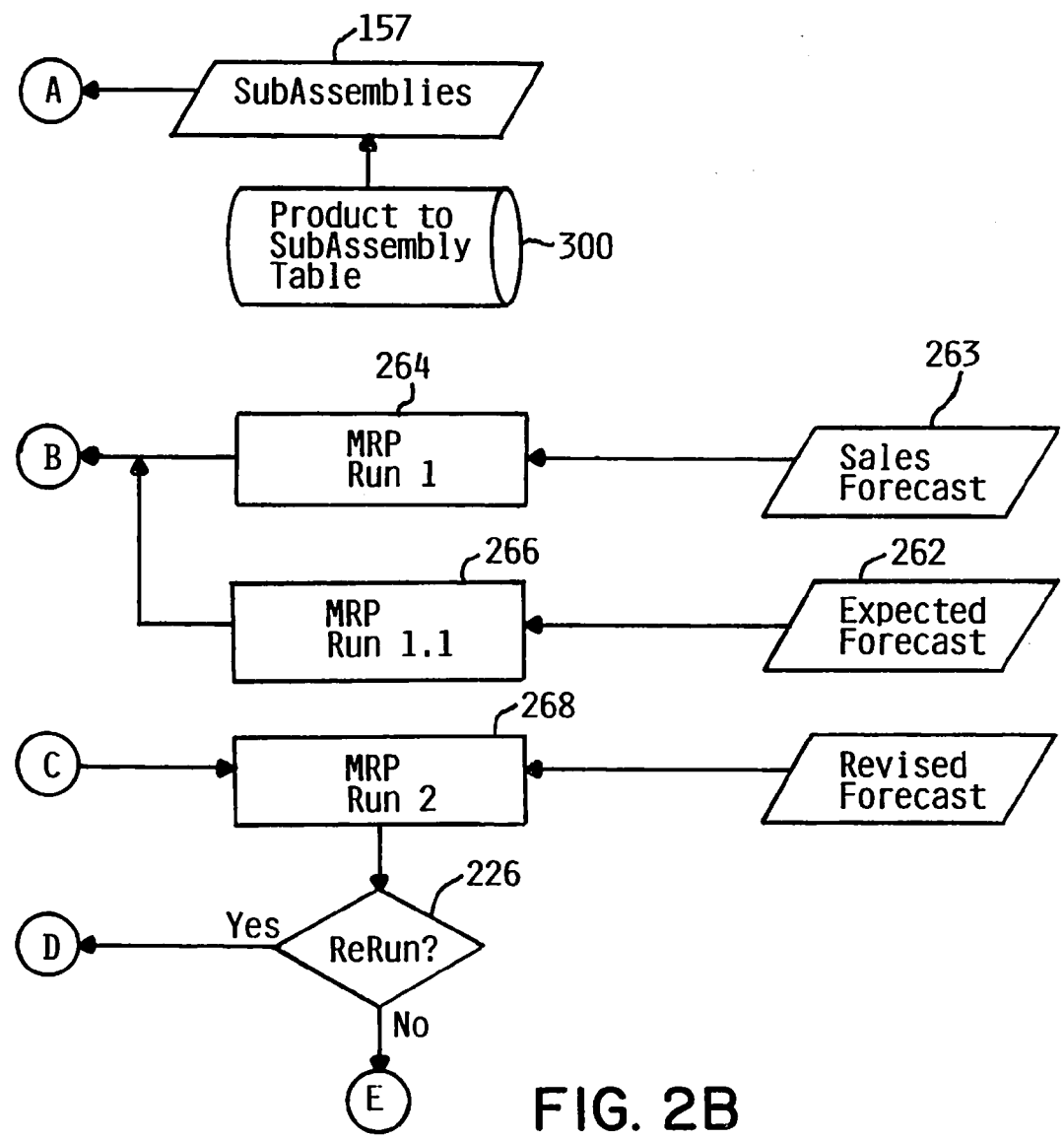

FIG. 2 shows the operation of the common parts planning system 100 in more detail. At block 202, the manufacturing organization creates a Bill of Materials (BOMs) 154a-154n for each sales model 156a-156n that it produces. These BOMs 154 reviewed should include all products 156 planned to be produced by the organization, including those produced at multiple locations and by its outside suppliers/original equipment suppliers (OEMs). One suitable determining factor for inclusion is whether or not the model 156 is part of the manufacturing organization's volume planning processes.

Figure 3:
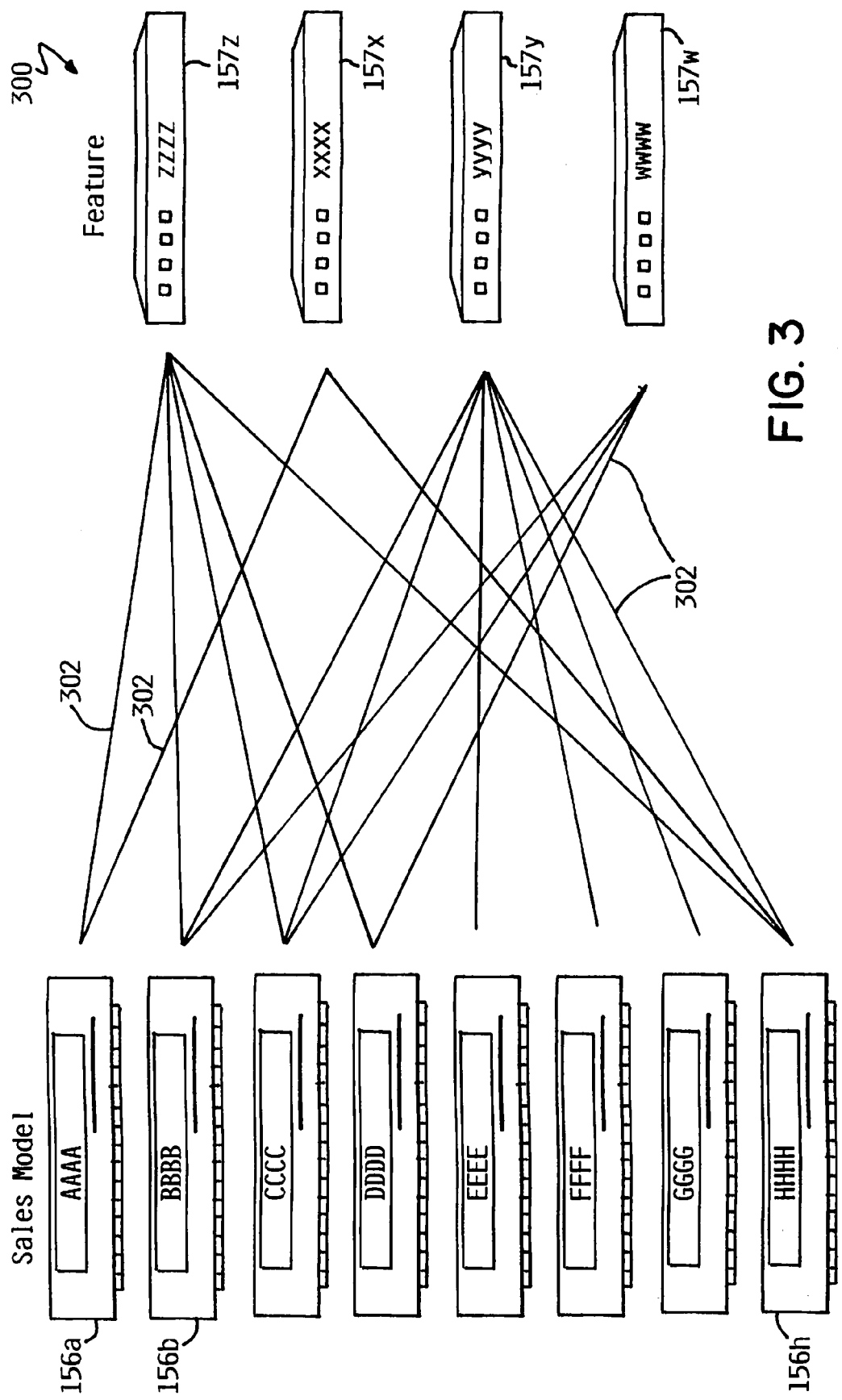
FIG. 3 illustrates an example sales model to feature relationship diagram.
Figure 4A:
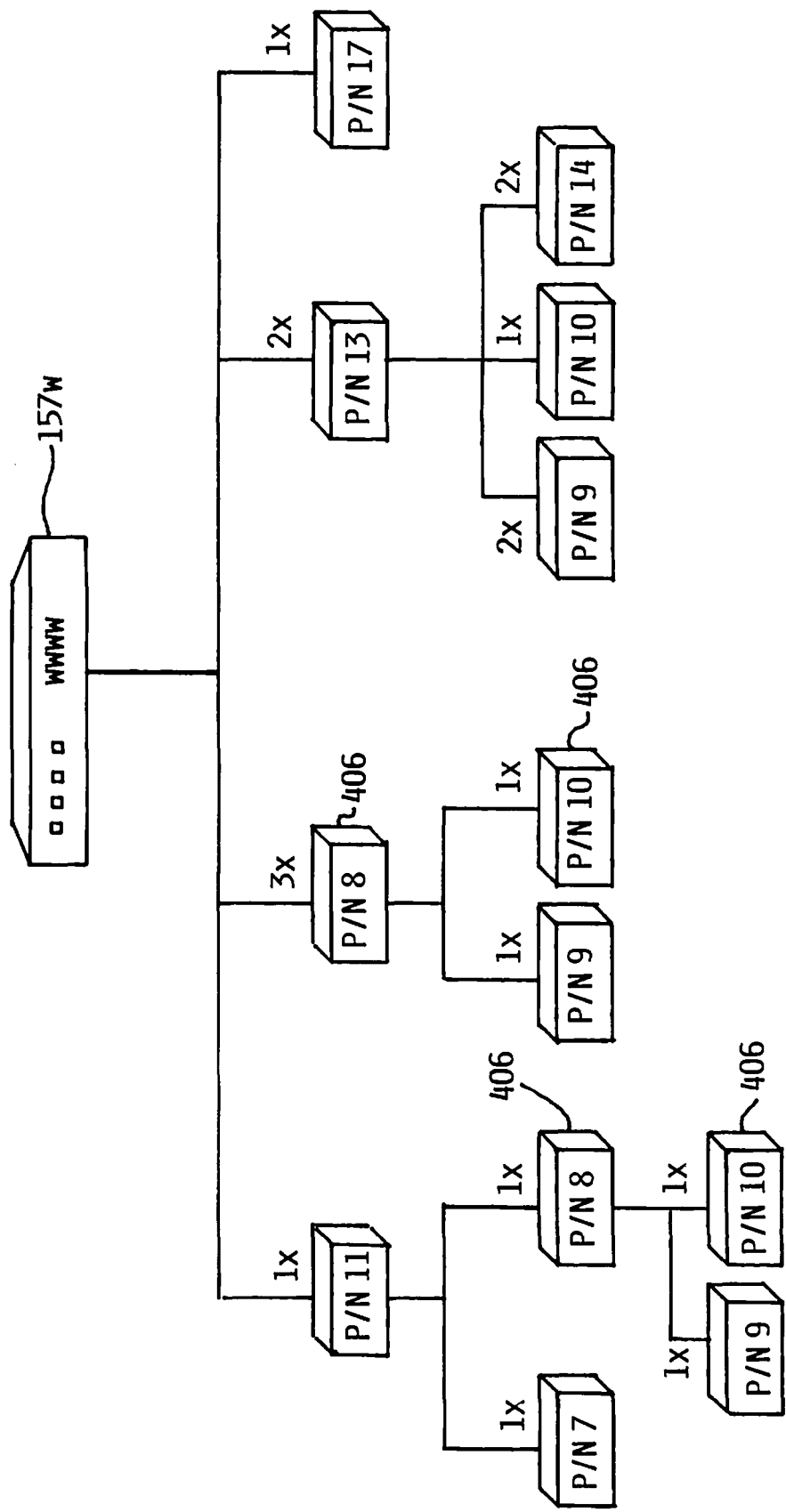
FIGS. 4a-4d illustrate a bill of materials structure
Figure 4B:
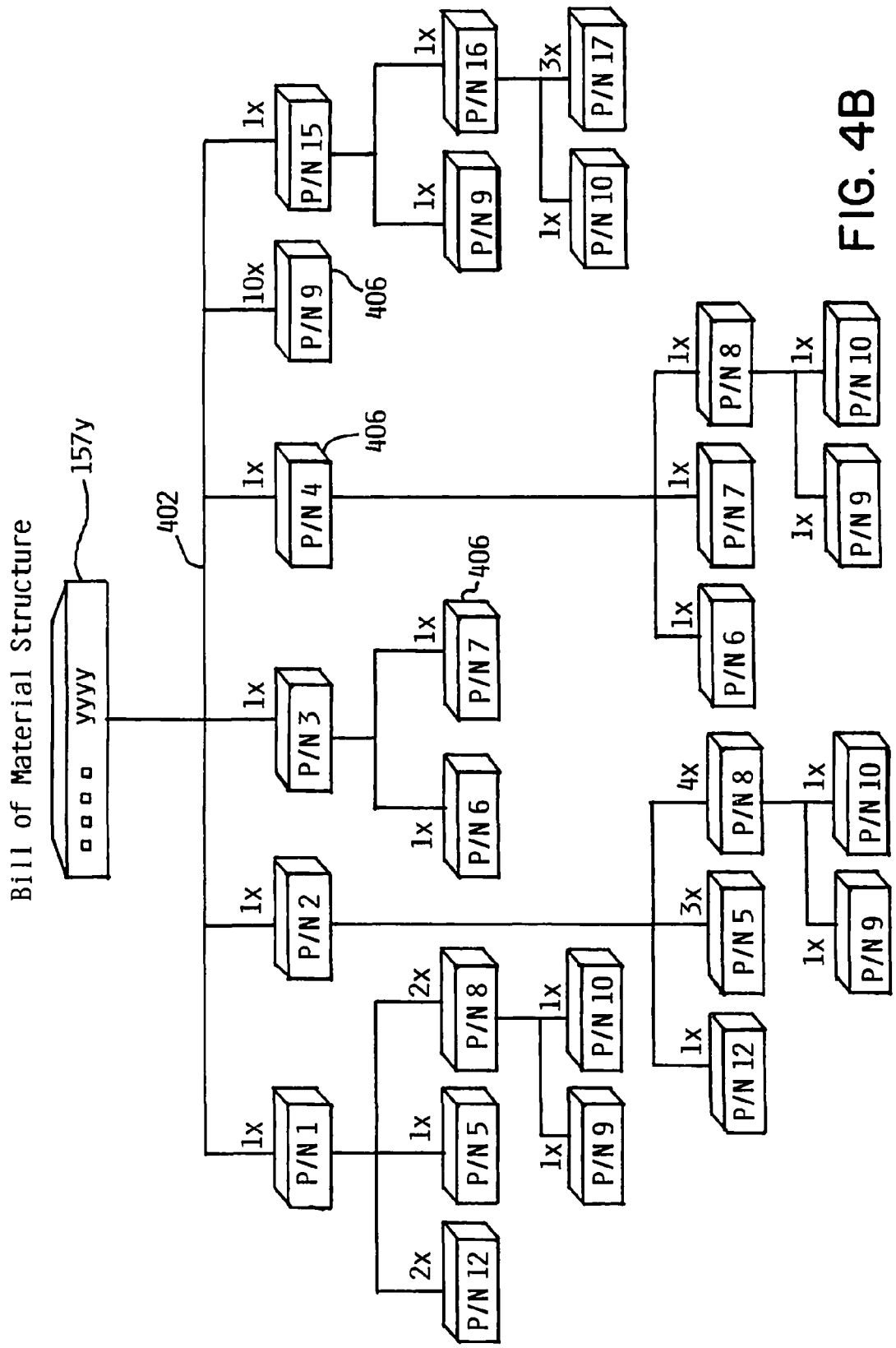
Figure 4C:
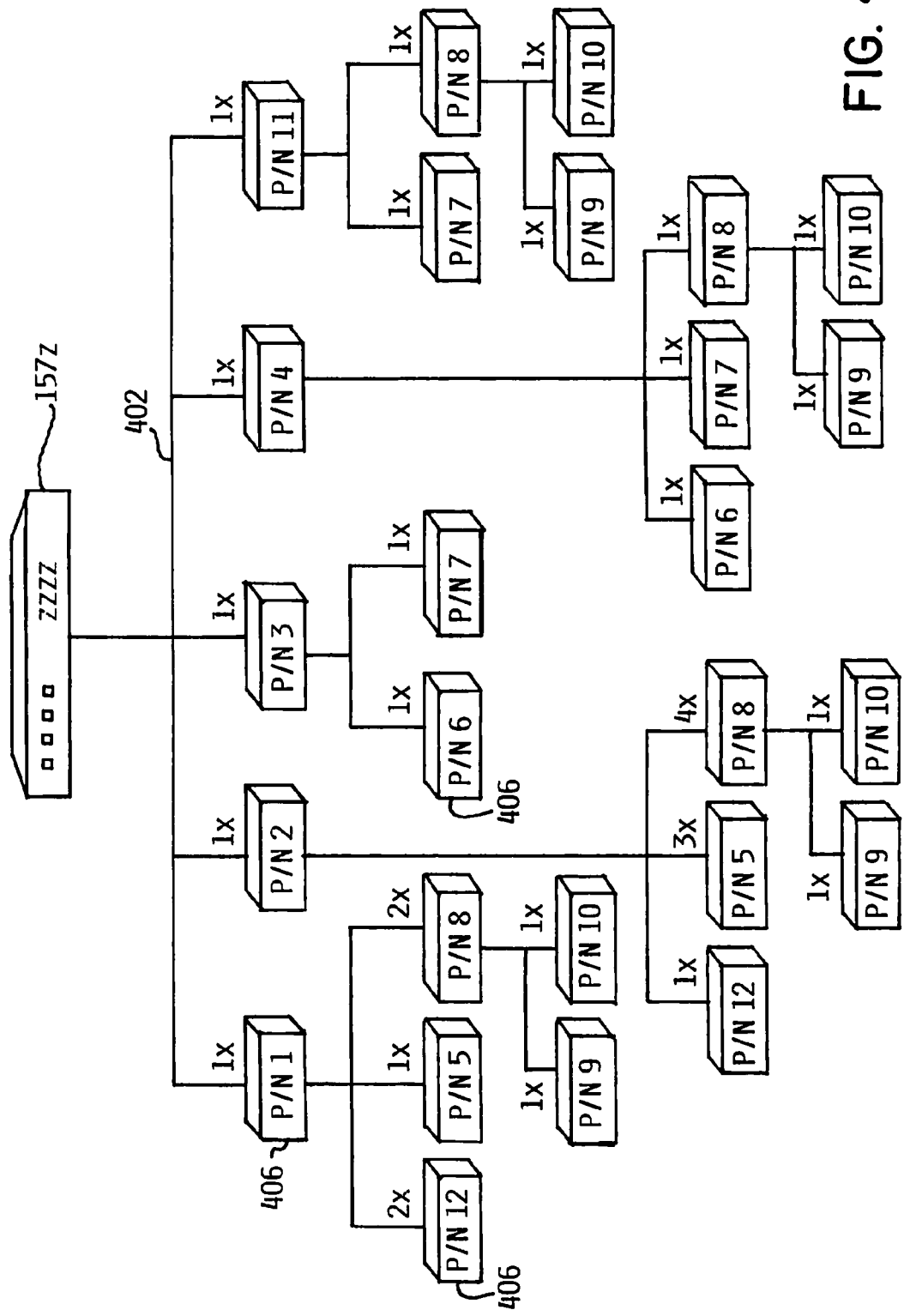
Figure 4D:
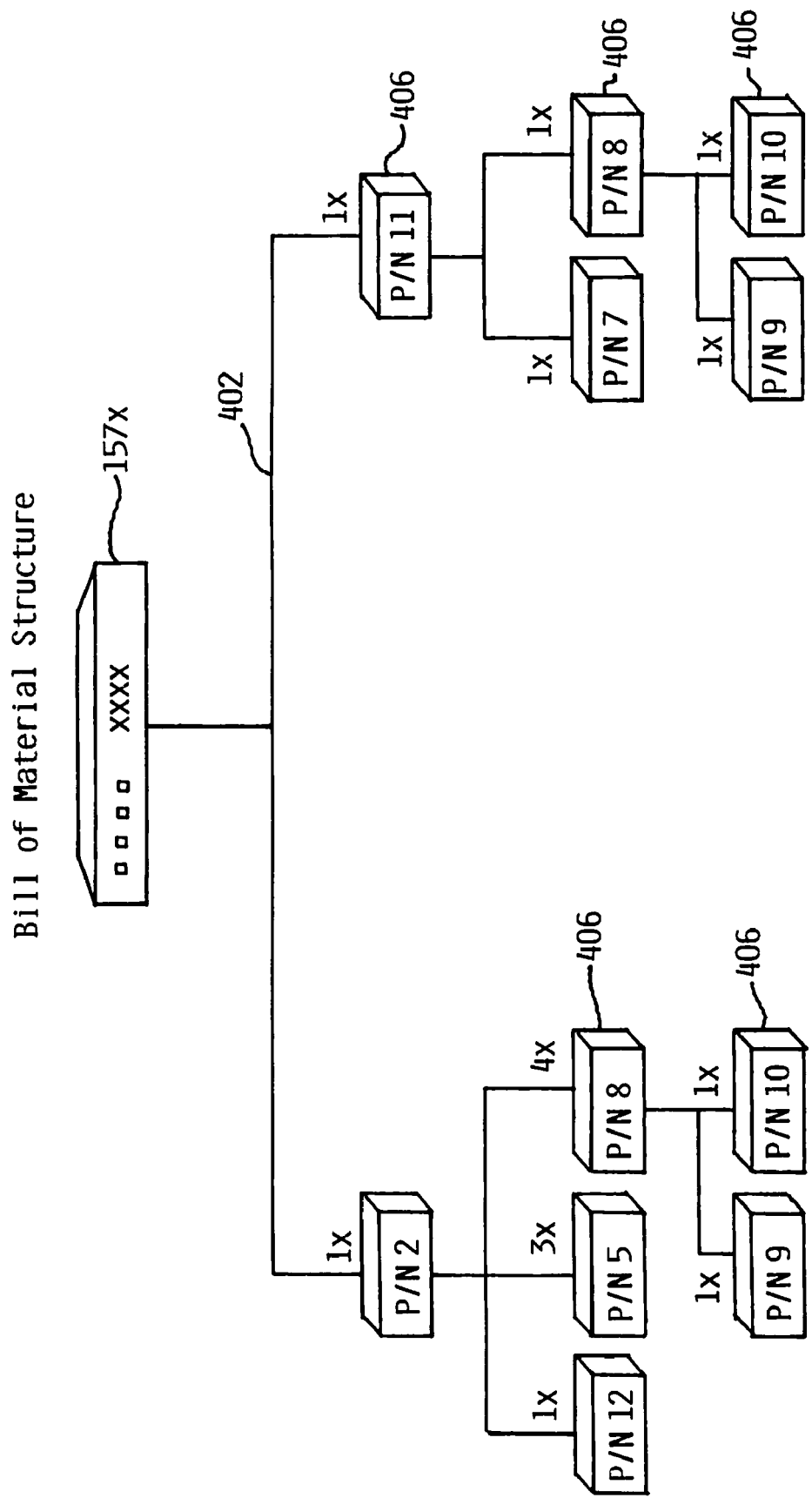

At block 204, the organization uses the product BOMs (created at block 202) to generate a list of subassemblies 157 used by each sales model 156. The organization then creates a list 158 of common parts by each subassembly 157 at block 206. At blocks 204-206, the organization may utilize a product-to-subassembly table 300, shown in more detail in FIG. 3, to generate help generate the P/N lists 157-158. This subassembly table embodiment 300 shows a plurality of relationships 302 of between several hypothetical sales models 156a-156h (only some labeled for clarity) and their features or subassemblies 157w-157z.

Figure 5:
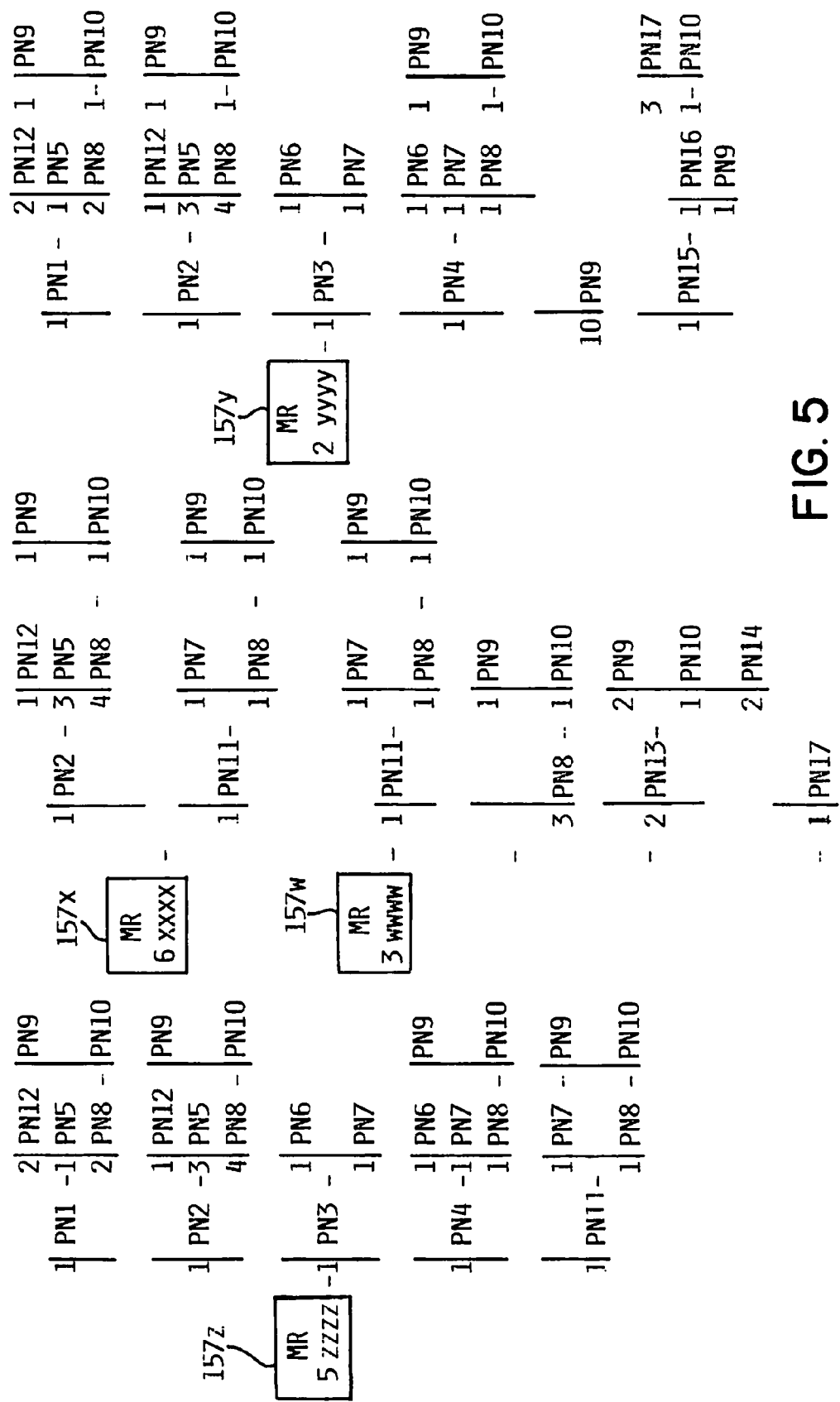
FIG. 5 illustrates a bill of materials table.

The manufacturing entity then uses the P/N data 157-158 to establish common part factors at block 210. Commonality in this embodiment would include anything with the same purchase part number (P/N) occurring in more than one BOM 154. At block 250, the organization may generate P/N commonality tables 400, such as those shown in FIGS. 4A-4D, to help generate these commonality factors. These P/N commonality tables 400 show the relationships 402 between several hypothetical subassemblies 157w-157z and their individual part numbers 406 (only some relationships 402 and P/N 406 labeled for clarity). These relationships 402 are then summarized in tabular form, expanding the "goes into" relationship by including the multiples of each P/N (best shown in FIG. 5)

At block 210, the common parts planning system 100 uses the information collected at blocks 202-206 to generate commonality factors for each common parts. Next, to determine the anticipated demand variability, the system 100 invokes Materials Requirement Planning (MRP) runs at blocks 264 and 266 at the P/N level, using the Sales Forecasts and the Expected Forecast as respective inputs. More information about MRP runs can be found at: http://en.wikipedia.org/wiki/Material requirements planning, which is herein incorporated by reference in its entirety.

The difference between these MRP simulation results is used at block 262 to generate the P/N delta demand. Multiplying the commonality factor times the delta demand yields a Correction Value (again, at the P/N level) at block 212. The planning system 100 then applies the commonality factor to the demand data at block 214 to reduce the forecast demand and then applies the commonality factors at block 214 to remove some of the safety buffers for these common parts. That is, the planning system 100 in this embodiment calculates a commonality factor for each common part in the BOMs 154. These commonality factors are related to how much less the total demand variability will be when duplicate parts occur in various product BOMs 154 than the total demand variability would be for the same number of unique parts. The system 100 uses these factors to develop correction factors to the demand forecasts. The delta allowed can be stored in table 159.

Two embodiments of a method for calculating the commonality factors will be explained in more detail below. In the first embodiment, the system 100 assumes large sample size and normality in its derivation, and would best apply to enterprises less at risk to lost sales or productivity losses due to stock-outs. Assuming normality and large sample size, this reduced demand variability is expressed in embodiment by:

$$\text{Total Demand Variation for '}n\text{' unique parts} = \Sigma \sigma_u = \sigma_1 + \sigma_2 + \sigma_3 + \ldots + \sigma_n$$

$$\text{Total Demand Variation for '}n\text{' common parts} = \Sigma \sigma_c = \sqrt{(\sigma_1^2 + \sigma_2^2 + \sigma_3^2 + \ldots + \sigma_n^2)}$$

The system 100 uses these expressions to develop correction factors related to the degree of commonality. To determine the anticipated demand variability, the system 100 compares (at block 262) the level of the unbiased forecast (input at block 263) to the sales forecast (i.e., the forecast buffered for demand variability; input at block 264). The difference between the two forecasts is the quantification of the expected range of demand variability. One desirable feature of this embodiment is, after calculating the demand delta at block 262, the manufacturing organization does not need to know the actual standard deviation or the percent serviceability because the demand delta is the resultant effect needed to establish the common part correction.

To calculate the correction factors, the system 100 in this embodiment normalizes the forecasts to the Unbiased, setting its mean equal to 1.0. The sales forecast mean is then 1.0+'d,' the expected demand variation. Next, the system 100 will use 'x' as the number of Standard Deviations. The combined Standard Deviations of 'n' unique parts would then be $\Sigma\sigma_u = n \times \sigma_u$. Likewise, the combined Standard Deviations of n common parts would then be $\Sigma\sigma_c = \sqrt{(n \times \sigma_c)^2}$ The planning ratio of common parts to unique parts would be equal to $\Sigma\sigma_c/\Sigma\sigma_u$, which in turn is equal to $\sqrt{(n \times \sigma_c)^2}/\sqrt{(n \times \sigma_u)}$. Because part standard deviation is driven by the Sales Model standard deviation, the system 100 assumes in this embodiment that $\sigma_c$ and $\sigma_u$ are approximately equal. This allows the system 100 to simplify the relationship to $\sqrt{n}/n$, which in turn, removes Standard Deviation as a required value. That is, the correction factors in this embodiment are not dependant on being able to quantify the Standard Deviation. The correction factor to the unbiased forecast is then $1+d(\sqrt{n}/n)$. This correction is represented graphically in FIG. 6, assuming a d=0.1 (or a 10% difference between unbiased forecast and the sales forecast).

In a second embodiment, the system 100 assumes small sample sizes and uses the Student's "t" statistic to develop the opportunity to which commonality can be recognized and leveraged. In these embodiments, the difference between the upper limit demand for a part and its expected or unbiased demand is taken to be the implied confidence level required for a part in a 'no commonality recognition' scenario. Though shown in the simulation in FIG. 6, the final MRP reduction potential is independent of the parts historical standard deviation about its demand forecast. A confidence interval of 90% is used for this example.

The error about a population sample modeled by the Student's "t" distribution is:

$$("t" \times "s")/\sqrt{n} \text{ where:}$$

"t" is the cumulative probability lookup value for a given sample size
"s" is the assumed population standard deviation
"n" is the number of common parts.

Figure 7:
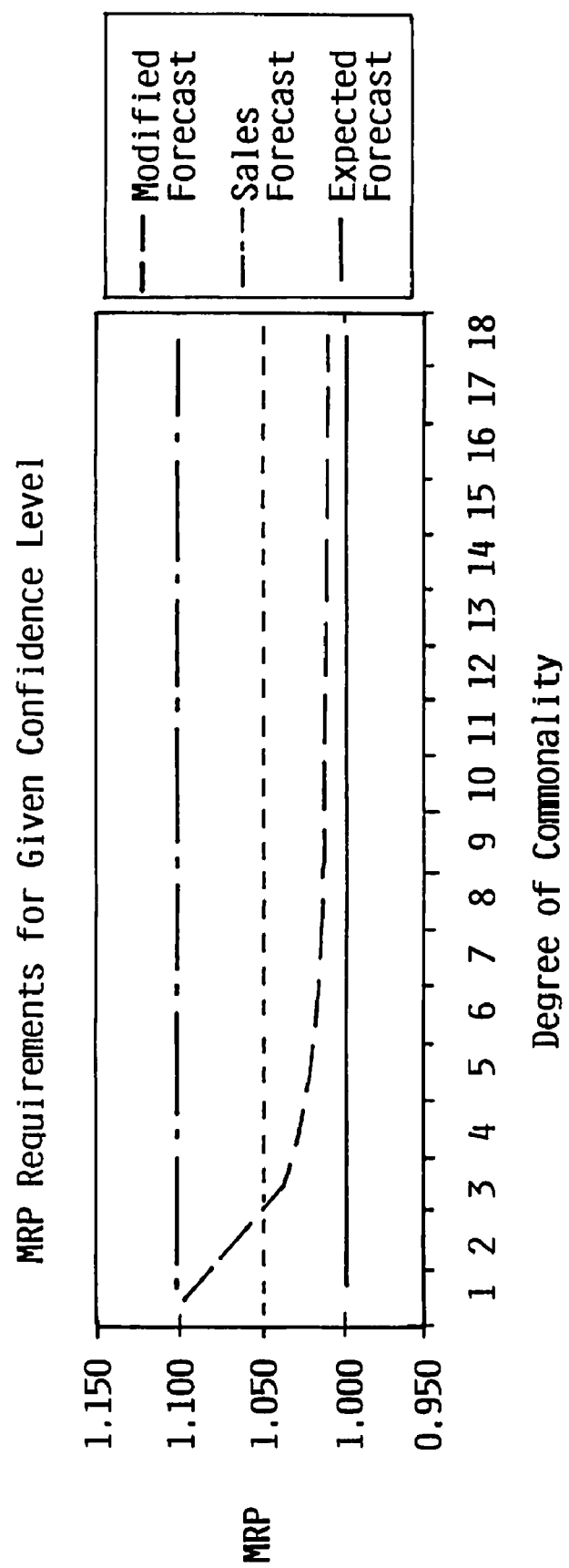

These variables are combined per FIG. 7 to show that % takedown from the baseline MRP that maintains the same level of risk as that with no parts commonality. To the extent that covariance exists between the various cases shown, the % takedown can be even more aggressive. The effect of applying the commonality factor to the forecast at a gross level is illustrated in FIG. 8.

In both approaches, a baseline acceptable level of risk is established for no common parts recognition. This level of risk, and its inherent probability of being "out of supply" is then maintained. For the same level of risk but with increasing degree of commonality, the requirements for a given part can be reduced over a given time period.

Figure 6:
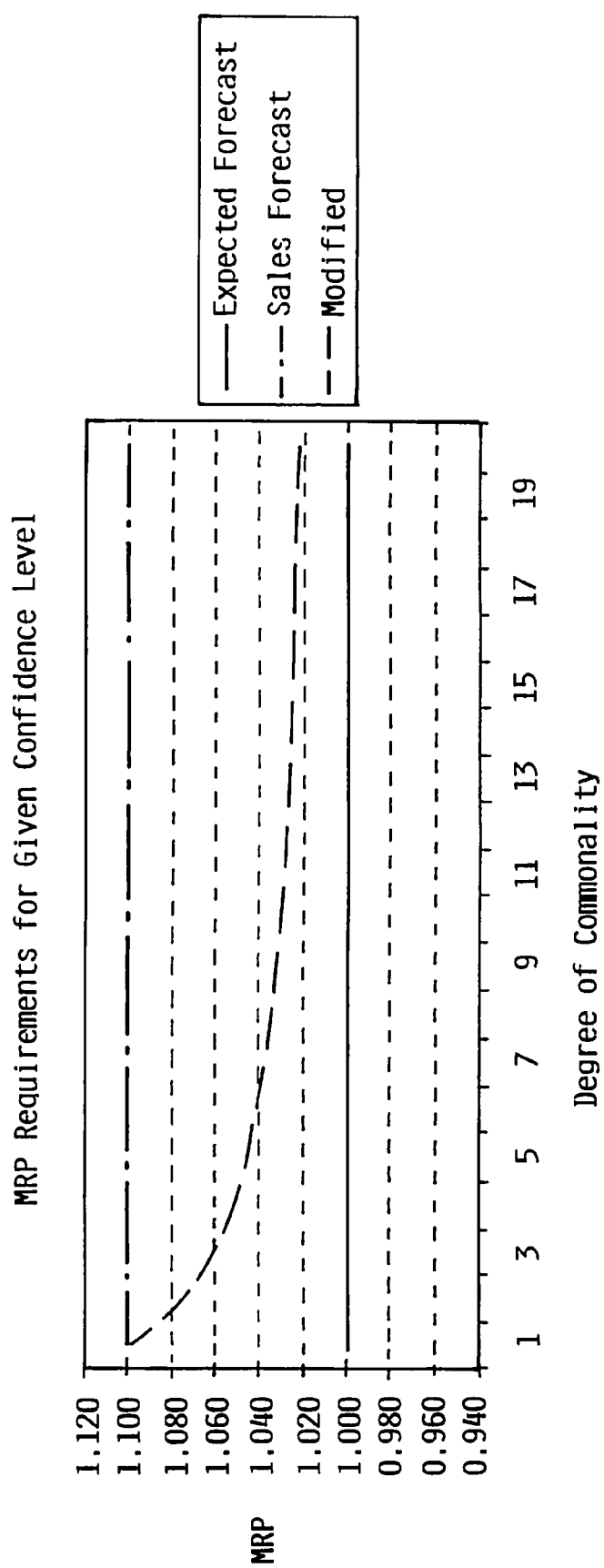
FIGS. 6 and 7 illustrate the MSP requirements for a given confidence level.

Referring again to FIG. 2, once the commonality factor for each P/N has been determined at block 212, the next step is to calculate the forecast demand correction at block 214. The resulting Correction Value is then input into a second MRP run 268 with the sales plan requirements to produce the corrected output demand. A sample result of this calculation is shown in FIGS. 6-7.

At blocks 220-230, the manufacturing organization should verify the opportunity for reduction by simulation and testing on that firm's inherent planning platform. Finally, the resulting forecast is reviewed for potential errors. If none are identified, the forecast is accepted. If errors are found, they are corrected for a final MRP run at block 228. This final forecast is then sent to the suppliers at block 235 to establish the requirements pipeline.

Referring again to FIG. 1, this computing system 100 embodiment comprises a plurality of central processing units 110a-110d (herein generically referred to as a processor 110 or a CPU 110) connected to the main memory unit 112, the mass storage interface 114, the terminal/display interface 116, the network interface 118, and the input/output ("I/O") interface 120 by a system bus 122. The mass storage interfaces 114, in turn, connect the system bus 122 to one or more mass storage devices, such as a direct access storage device 140 or a readable/writable optical disk drive 142. The network interfaces 118 allow the computer system 100 to communicate with other computing systems 100 over the communications medium 106. The main memory unit 112 in this embodiment also stores an operating system 152, the plurality of application programs 126—including the inventory management program 153—and the program data 151.

The computing system 100 in this embodiment is a general-purpose computing device. Accordingly, the CPUs 110 may be any device capable of executing program instructions stored in the main memory 112 and may themselves be constructed from one or more microprocessors and/or integrated circuits. In this embodiment, the computing system 100 contains multiple processors and/or processing cores, as is typical of larger, more capable computer systems; however, in other embodiments, the computing systems 100 may comprise a single processor system 110 and/or a single processor 110 designed to emulate a multiprocessor system.

When the computing system 100 starts up, the associated processor(s) 110 initially execute the program instructions that make up the operating system 152, which in turn, manages the physical and logical resources of the computer system 100. These resources include the main memory 112, the mass storage interface 114, the terminal/display interface 116, the network interface 118, and the system bus 122. As with the processor(s) 110, some computer system 100 embodiments may utilize multiple system interfaces 114, 116, 118, 120, and busses 122, which in turn, may each include their own separate, fully programmed microprocessors.

The system bus 122 may be any device that facilitates communication between and among the processors 110; the main memory 112; and the interfaces 114, 116, 118, 120. Those skilled in the art will appreciate that the system bus 122 may be a relatively simple, single bus structure that provides a direct communication path among the system bus 122 (as depicted in FIG. 10), or may be a more complex structure, such as point-to-point links in hierarchical, star or web configurations; multiple hierarchical buses; parallel and redundant paths, etc.

The main memory 112 and the mass storage device(s) 140 work cooperatively in this to store the operating system 152, the application programs 126, and the program data 128. In this embodiment, the main memory 112 is a random-access semiconductor device capable of storing data and programs. Although FIG. 1 conceptually depicts this device as a single monolithic entity, the main memory 112 in some embodiments may be a more complex arrangement, such as a hierarchy of caches and other memory devices. For example, the main memory 112 may exist in multiple levels of caches, and these caches may be further divided by function, so that one cache holds instructions while another holds non-instruction data, which is used by the processor or processors. Memory may be further distributed and associated with different CPUs 110 or sets of CPUs 110, as is known in any of various so-called non-uniform memory access (NUMA) computer architectures. Moreover, some embodiments may utilize virtual addressing mechanisms that allow the computing systems 1000 to behave as if it has access to a large, single storage entity instead of access to multiple, smaller storage entities such as the main memory 112 and the mass storage device 140.

Although the operating system 124, the application programs 126, and the program data 128 are illustrated as being contained within the main memory 112, some or all of them may be physically located on different computer systems and may be accessed remotely, e.g., via the communications medium 16, in some embodiments. Thus, while the operating system 124, the application programs 126, and the program data 128 are illustrated as being contained within the main memory 112, these elements are not necessarily all completely contained in the same physical device at the same time, and may even reside in the virtual memory of other computer systems 100.

The system interface units 114, 116, 118, 120 support communication with a variety of storage and I/O devices. The mass storage interface unit 114 supports the attachment of one or more mass storage devices 140, which are typically rotating magnetic disk drive storage devices, although they could alternatively be other devices, including arrays of disk drives configured to appear as a single large storage device to a host and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices and the like.

The terminal/display interface 116 directly connects one or more display units 180 to the computer system 100. These display units 180 may be non-intelligent (i.e., dumb) terminals, such as a cathode ray tube, or may themselves be fully programmable workstations used to allow IT administrators and users to communicate with the computing system 100. Note, however, that while the interface 116 is provided to support communication with one or more displays 180, the computer systems 100 does not necessarily require a display 180 because all needed interaction with users and other processes may occur via network interface 118.

The computing system 100 in FIG. 1 is depicted with multiple attached terminals 180, such as might be typical of a multi-user "mainframe" computer system. In such a case, the actual number of attached devices is typically greater than those shown in FIG. 1, although the present invention is not limited to systems of any particular size. The computing systems 100 may alternatively be a single-user system, typically containing only a single user display and keyboard input, or might be a server or similar device which has little or no direct user interface, but receives requests from other computer systems (clients). In other embodiments, the computing systems 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The communications medium 106 may be any suitable network or combination of networks and may support any appropriate protocol suitable for communication of data and/or code to/from multiple computing systems 100. Accordingly, the network interface(s) 118 can be any device or combination of devices that facilitate such communication, regardless of whether the network connection is made using present day analog and/or digital techniques or via some networking mechanism of the future. Those skilled in the art will appreciate that many different network and transport protocols can be used to implement the network. The Transmission Control Protocol/Internet Protocol ("TCP/IP") suite contains suitable network and transport protocols.

One exemplary computing system 100 is the System i platform running the i5/OS multitasking operating system, both of which are available from International Business Machines Corporation of Armonk, N.Y. However, those skilled in the art will appreciate that the methods, systems, and apparatuses of the present invention apply equally to any computing system 100 and operating system combination, regardless of whether one or both of the computer systems 100 are complicated multi user computing apparatuses, a single workstations, lap-top computers, mobile telephones, personal digital assistants ("PDAs"), video game systems, or the like.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of tangible, computer-readable signal bearing medium used to actually carry out the distribution. Examples of suitable tangible, computer-readable signal bearing media include, but are not limited to: (i) non-writable storage media (e.g., read only memory devices ("ROM"), CD-ROM disks readable by a CD drive, and Digital Versatile Disks ("DVDs") readable by a DVD drive); and (ii) writable and rewritable storage media (e.g., floppy disks readable by a diskette drive, CD-R and CD-RW disks readable by a CD drive, random access memory ("RAM"), and hard disk drives). Those skilled in the art will also appreciate that the present invention may be embodied as the storage in a publicly accessible location of and/or the transmission of computer software that performs some or all of these acts described herein.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. The software in these embodiments may be deployed in these embodiments using any suitable software fulfillment technique, including without limitation: (i) distributing non-rewritable storage media (e.g., CD-ROM disks readable by a CD-ROM drive or DVD-ROM disks readable by a DVD-ROM drive); (ii) storing a program on a network accessible storage media (e.g., a public website, a public FTP site), receiving a request for the program, and transmitting the program to the requestor over the network. Aspects of these embodiments may further include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature.

Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

What is claimed is:

1. An apparatus comprising:
    at least one processor;
    a memory coupled to the at least one processor; and
    an inventory planning mechanism residing in the memory and executed by the at least one processor, the inventory mechanism adapted to:
    determine a use requirement of at least one common component and at least one unique component in a plurality of product models;
    receive a sales forecast and an expected forecast for each of the plurality of product models that use the common component;
    compute, for each of the at least one common components, a first total feature requirement based on the sales forecast and the determined use requirement of the at least one common component;
    compute, for each of the at least one common components, a second total feature requirement based on the expected forecast and the determined use requirement of the at least one common component;
    compute a commonality factor for each of the at least one common components;
    compute a delta demand for the at least one common components based on a difference of the first total feature requirement and the second total feature requirement;
    compute a demand correction factor for each of the at least one common components by multiplying the commonality factor by the delta demand; and
    compute demand requirements for each of the at least one common components by subtracting the demand correction factor from the second total feature requirement.

2. The apparatus of claim 1 wherein the inventory planning mechanism is further adapted to determine current inventory of the common component.

3. The apparatus of claim 1, wherein the inventory planning mechanism is further adapted to analyze a product bill of materials to identify common parts.

4. A computer-implemented method for determining purchase requirements for a component in an inventory control system, comprising:
    determining a use requirement for at least one common component and at least one unique component in a plurality of product models;
    receiving a sales forecast and an expected forecast for each of the plurality of product models that use the common component;
    computing, for each of the at least one common components, a first total feature requirement based on the sales forecast and the determined use requirement of the at least one common component;
    computing, for each of the at least one common components, a second total feature requirement based on the expected forecast and the determined use requirement of the at least one common component;
    computing a commonality factor for each of the at least one common components;
    computing a delta demand for the at least one common components based on a difference of the first total feature requirement and the second total feature requirement;
    computing a demand correction factor for each of the at least one common components by multiplying the commonality factor by the delta demand; and
    computing, by operation of one or more computer processors, demand requirements for each of the at least one common components by subtracting the demand correction factor from the second total feature requirement.

5. The computer-implemented method of claim 4, wherein determining demand requirements comprises reading a description for the at least one assembly that specifies at least one component of the at least one assembly.

6. The computer-implemented method of claim 4, further comprising determining a current inventory of the common component.

7. The computer-implemented method of claim 4, further comprising analyzing a product bill of materials to identify common parts.

8. The computer-implemented method of claim 4, wherein the demand correction factor is based at least in part on the delta demand and on a degree of commonality between the product models.

9. A computer program product for determining purchase requirements for a component in an inventory control system, the computer program product comprising:
    a non-transitory computer-readable storage medium having computer-readable program code embodied therewith, the computer-readable program code comprising:
    computer-readable program code configured to determine a use requirement of at least one common component and at least one unique component in a plurality of product models;
    computer-readable program code configured to receive a sales forecast and an expected forecast for the plurality of product models that use the common component;
    computer-readable program code configured to compute, for each of the at least one common components, a first total feature requirement based on the sales forecast and the determined use requirement of the at least one common component;
    computer-readable program code configured to compute, for each of the at least one common components, a second total feature requirement based on the expected forecast and the determined use requirement of the at least one common component;
    computer-readable program code configured to compute a commonality factor for each of the at least one common components;
    computer-readable program code configured to compute a delta demand for the at least one common components based on a difference of the first total feature requirement and the second total feature requirement;
    computer-readable program code configured to compute a demand correction factor for each of the at least one common components by multiplying the commonality factor by the delta demand; and
    computer-readable program code configured to compute demand requirements for each of the at least one common components by subtracting the demand correction factor from the second total feature requirement.

10. The computer program product of claim 9, wherein determining demand requirements comprises reading a description for the at least one assembly that specifies at least one component of the at least one assembly.

11. The computer program product of claim 9, wherein the computer-readable program code further comprises computer-readable program code configured to determine a current inventory of the common component.

12. The computer program product of claim 9, wherein the computer-readable program code further comprises computer-readable program code configured to analyze a product bill of materials to identify common parts.

13. The computer program product of claim 9, wherein the demand correction factor is related to a degree of commonality between the product models that use the common component.

14. The apparatus of claim 1, wherein computing the commonality factor for each of the at least one common components comprises:
   computing a total demand variation for each of the at least one unique parts;
   normalizing the sales forecast, wherein the sales forecast is unbiased;
   computing a difference of the unbiased forecast and the sales forecast;
   computing a first ratio by dividing the square root of the number of common products by the number of common products; and
   computing the commonality factor by adding one to the product of the difference of the unbiased forecast and the sales forecast and the first ratio.

15. The apparatus of claim 14, wherein the demand requirements for the at least one common component reflects a lower total demand variation than a total demand variation for the at least one unique component.

16. The computer-implemented method of claim 4, wherein computing the commonality factor for each of the at least one common components comprises:
   computing a total demand variation for each of the at least one unique parts;
   normalizing the sales forecast, wherein the sales forecast is unbiased;
   computing a difference of the unbiased forecast and the sales forecast;
   computing a first ratio by dividing the square root of the number of common products by the number of common products; and
   computing the commonality factor by adding one to the product of the difference of the unbiased forecast and the sales forecast and the first ratio.

17. The computer-implemented method of claim 16, wherein the demand requirements for the at least one common component reflects a lower total demand variation than a total demand variation for the at least one unique component.

18. The computer-program product of claim 9, wherein computing the commonality factor for each of the at least one common components comprises:
   computing a total demand variation for each of the at least one unique parts;
   normalizing the sales forecast, wherein the sales forecast is unbiased;
   computing a difference of the unbiased forecast and the sales forecast;
   computing a first ratio by dividing the square root of the number of common products by the number of common products; and
   computing the commonality factor by adding one to the product of the difference of the unbiased forecast and the sales forecast and the first ratio.

19. The computer-program product of claim 18, wherein the demand requirements for the at least one common component reflects a lower total demand variation than a total demand variation for the at least one unique component.

* * * * *